June 21, 1938.  J. S. PARSONS ET AL  2,121,608
NETWORK SYSTEM OF DISTRIBUTION
Original Filed May 19, 1934  2 Sheets-Sheet 2
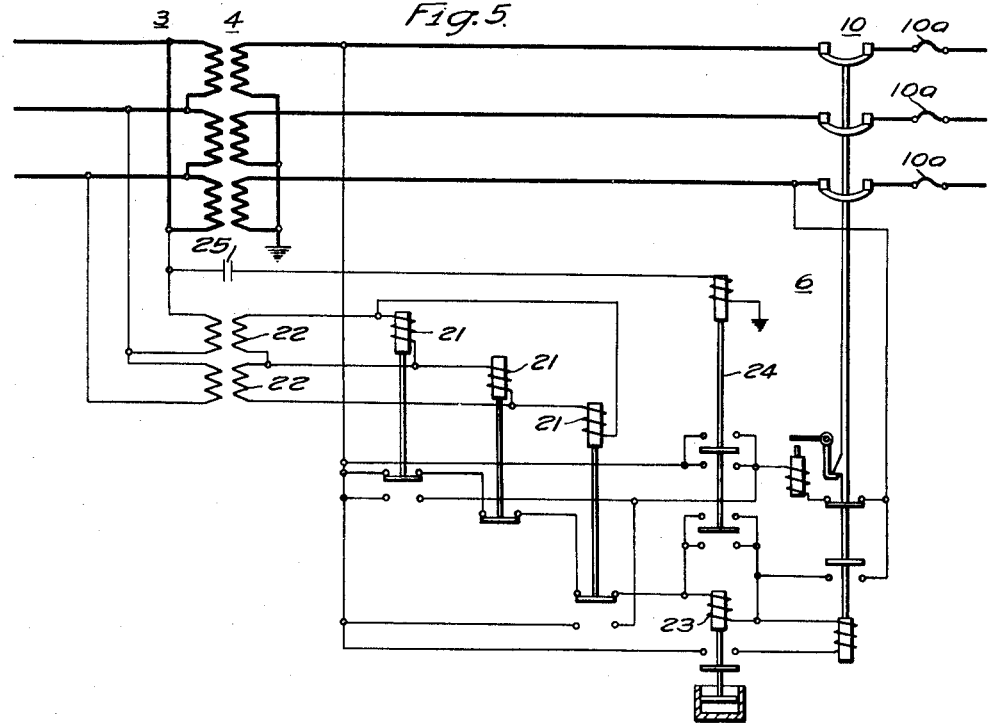
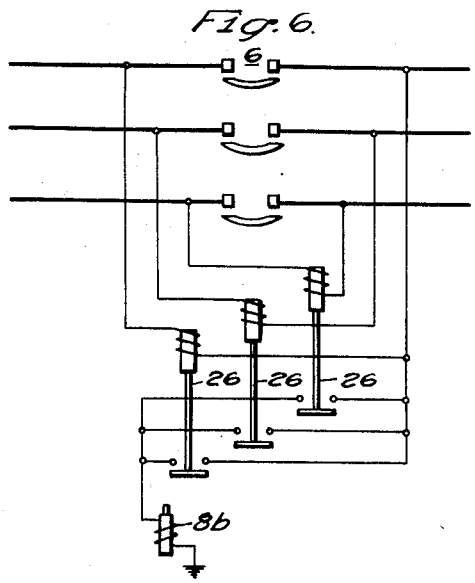
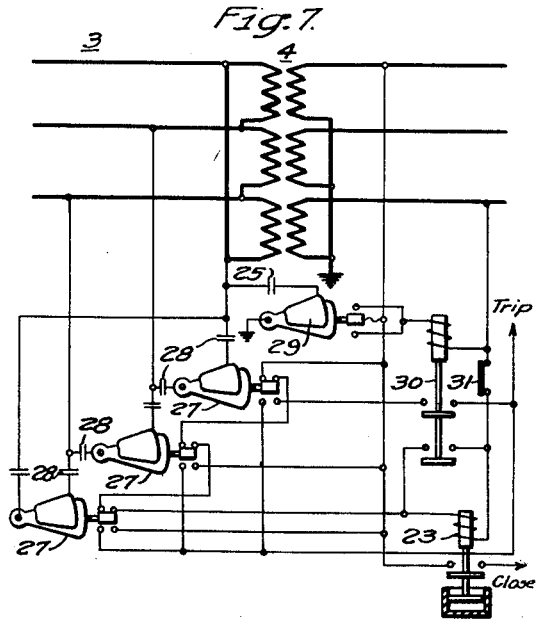
WITNESSES:
INVENTORS
John S. Parsons and
George O. Harrison.
BY
ATTORNEY Patented June 21, 1938

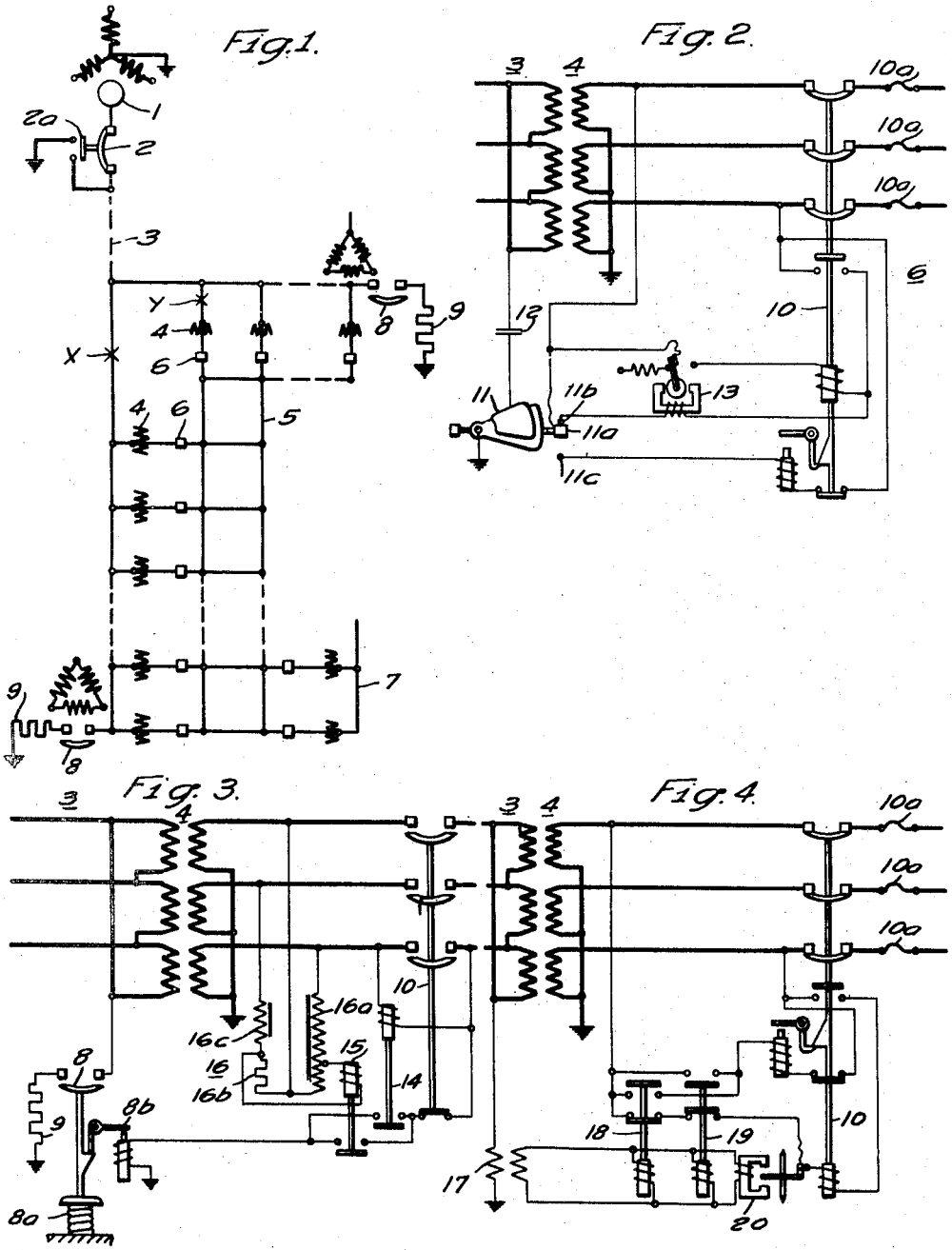

2,121,608

UNITED STATES PATENT OFFICE 2,121,608

NETWORK SYSTEM OF DISTRIBUTION

John S. Parsons, Swissvale, and George O. Harrison, Wilkinsburg, Pa., assignors to Westinghouse Electric & Manufacturing Company, East Pittsburgh, Pa., a corporation of Pennsylvania Original application May 19, 1934, Serial No. 726,576. Patent No. 2,075,132, dated March 30, 1937. Divided and this application February 27, 1937, Serial No. 128,204

6 Claims. (Cl. 171—97)

The present application is a division of our copending application, Serial No. 726,576, filed May 19, 1934, now U. S. Patent No. 2,075,132, granted March 30, 1937, assigned to Westinghouse Electric & Manufacturing Company. In our parent patent, mentioned above, there is disclosed a simplified network distribution system having the usual alternating-current distribution network supplied by means of a plurality of feeders through banks of step-down transformers, and having network circuit breakers located at the usual positions for individually controlling the power flow through the various banks of transformers. However, in place of the usual induction relay equipment for the network protectors, our parent patent discloses a novel form of simplified control equipment and a novel method of operating the network to supply the network load and clear feeder faults.

In accordance with the principle of our prior patent, the phasing apparatus is separated from the reclosing apparatus of the individual network protectors, and is applied to the feeder in such a manner as to artificially create an abnormal condition of the feeder in the event of crossed phase connections. As explained in the patent, the artificial abnormal condition may be a loadback condition, a ground, phase-to-phase fault, or any other suitable electrical condition, dependent upon the type of apparatus employed, which will cause the network protectors to open or remain open as long as the crossed phase condition exists. In this way the necessity for individual phasing apparatus for the protectors is eliminated, and at the same time, protection is secured against crossed phases, without the necessity of an elaborate phase checking operation after every feeder fault.

The above-mentioned parent application also discloses a novel form of network protector control equipment in which separate relays are provided for detecting a transposed phase condition of any two feeder conductors and for detecting a rotation of all three feeder conductors through a phase angle of 120° or 240°. The present application relates to such control equipment in its application to alternating-current networks generally, and in its application to the specific form of network system disclosed and claimed in our above-mentioned prior patent. We do not claim herein, however, the use of such control equipment in its specific application to the forms of network apparatus having individual self-contained opening and closing equipment, as this subject-matter is described and claimed specifically in the copending sole application of John S. Parsons, Serial No. 128,203, filed Feb. 27, 1937, and assigned to Westinghouse Electric & Manufacturing Company.

It is, accordingly, an object of our present invention to provide a novel control system for polyphase alternating-current network apparatus in which individual electro-responsive devices are provided for detecting a transposition of any two feeder conductors and for detecting a rotation of all three feeder conductors through a phase angle of 120° or 240°.

A further object of our invention is to provide a novel phasing device for polyphase alternating-current networks operating upon the phase sequence principle.

Other objects of our invention will become evident from the following detailed description taken in conjunction with the accompanying drawing, in which:

Figure 1 is a diagrammatic view, in single-line form, of a polyphase network system embodying our invention;

Fig. 2 is a diagrammatic view of a simplified form of network protector to be used in the practice of our invention;

Fig. 3 is a diagrammatic view of a preferred form of control apparatus for the grounding switches used in the practice of our invention;

Figs. 4 and 5 are diagrammatic views of modifications of the protector shown in Fig. 2;

Fig. 6 is a diagrammatic view of a modification of the control apparatus shown in Fig. 3; and Fig. 7 is a diagrammatic view of a modified form of relay apparatus which we may use in the protector of Fig. 5.

Referring to Fig. 1 in detail, a polyphase grounded-neutral medium voltage source 1, which may be a generating station or substation bus, is connected by means of a feeder circuit breaker 2 to a feeder 3. The feeder circuit breaker 2 is equipped with the usual control apparatus for causing it to open in the event of a fault on the feeder 3. This control apparatus may include reclosing and lockout apparatus for effecting one or more reclosures and for locking the feeder breaker 2 in open position in the event of a permanent fault. As such apparatus is well known in the art and forms no part of the present invention, it has not been illustrated in the drawing. It will be assumed, however, that regardless of the form of control apparatus provided for the feeder breaker 2, the latter is locked out in approximately 15 seconds in the event of a permanent fault on the feeder 3. In addition to the usual protective apparatus, the feeder breaker 2 is arranged to control any suitable apparatus for grounding one conductor of the feeder 3 when the feeder breaker 2 is open, shown as back contacts 2a of the feeder breaker.

A plurality of banks of transformers 4 are connected to the feeder 3, for supplying power to a low-voltage polyphase network 5, in accordance with the usual practice. The banks of transformers 4 are preferably connected in delta on the feeder or high-voltage side and in star, with neutral grounded on the network side, but may be connected in other ways familiar to those skilled in the art. It is essential only, in the illustrated form of the invention, that the high voltage windings of the transformer banks 4 be ungrounded. A plurality of network protectors 6 are interposed between the transformer banks 4 and the network 5 in the usual manner, and the network 5 is supplied from the source 1 by means of other feeders, as indicated fragmentarily at 7.

In accordance with our invention, in addition to the network protectors 6, a normally open switch 8 is connected to one conductor of the feeder 3 adjacent the end of each major division of the feeder. The switches 8 are biased to closed position but are normally held open by electromagnetically controlled latches, as will be hereinafter described in connection with Fig. 3. The switches 8 are provided for artificially creating an abnormal condition of the feeder 3 in the event of crossed phases, as mentioned above, and for this purpose are preferably arranged to ground the conductor of the feeder 3 which is grounded by the back contact members 2a of the feeder breaker 2 when the latter is open. It will be assumed that the a-phase conductor of the feeder 3 is arranged to be grounded by either of the switches 8 or the back contacts 2a. A resistor 9 may be included in series with each switch 8 to limit the feeder current which will flow upon operation of one of the latter, if desired, but in the majority of applications, no such impedance would be necessary or desirable.

Referring to Fig. 2, which shows a network protector 6 as associated with a delta-star transformer bank 4, the network protector 6 consists of a network circuit breaker 10, a set of back-up fuses 10a and suitable control apparatus for the network circuit breaker 10. The latter may be of various forms but is shown as an electrostatic relay 11 connected by means of a capacitor 12 to a high voltage terminal of the transformer bank 4.

The electrostatic relay 11 is provided with a movable contact member 11a, a front contact member 11b and a back contact member 11c. This relay is so designed that the movable contact member 11a engages the front contact member 11b in response to a voltage condition of approximately 90% of the normal line-to-ground voltage of the feeder 3 and engages the back contact member 11c in response to an undervoltage condition of approximately 30% normal line-to-ground voltage.

The front contact member 11b is connected in circuit with a timing relay 13, preferably of the synchronous type commonly used in the art, for controlling the closure of the network circuit breaker 10 when feeder voltage conditions are approximately normal. The timing relay 13 is provided for preventing closure of the network circuit breaker 10 for a sufficient time interval to permit the operation of either of the grounding switches 8 in the event of crossed feeder phases. This time interval need be only a fraction of a second. However, in order to prevent voltage disturbances on the network 5, we prefer to introduce a time delay sufficient to permit the feeder breaker 2 to lock out in the event of crossed phase connections. For this purpose the timing relay 13 is preferably adjusted to introduce a time delay of the order of 20 to 30 seconds after energization of the feeder 3, before closure of the network circuit breaker 10. It will be assumed that the timing relay 13 closes in 20 seconds and opens substantially instantaneously. The timing relays 13 of the protectors 6 at the ends of the major divisions of the feeder 3 (Fig. 1), however, are adjusted to close with a slightly longer time delay, for example, 25 seconds, in order to permit a phase-checking operation when the protectors are closing on a deenergized network.

With this arrangement, the network circuit breaker 10 trips open in response to a phase-to-ground under-voltage condition below 30% normal on the a-phase conductor of feeder 3, and recloses with a time delay of twenty seconds, when the phase-to-ground voltage of the a-phase conductor of the feeder 3 is approximately normal.

Referring to Fig. 3, one of the normally open switches 8 is shown therein in connection with its control apparatus. The switch 8 is biased to closed position by means of a spring 8a but is normally held in open position by means of an electromagnetically released latch 8b. A voltage responsive relay 14 and a negative phase sequence voltage relay 15 are provided for controlling the closure of the switch 8 in the event of an abnormal relationship of feeder and network voltages. The voltage responsive relay 14 is connected across the main contact members of the nearest network circuit breaker 10, and is designed to close at a voltage value of approximately 130% normal phase-to-ground voltage of the low voltage network. The purpose of this relay is to trip the switch 8 to closed position in the event that all three conductors of the feeder have been rotated 120° or 240° in repairing a feeder fault.

The negative phase sequence voltage relay 15 is connected to a negative phase sequence voltage filter 16 to be energized in accordance with the negative symmetrical components of the polyphase voltage appearing across the secondary terminals of the transformer bank 4. The filter 16 is preferably of the type disclosed in the U. S. patent of B. E. Lenehan, No. 1,936,797 and comprises an auto-transformer 16a having a 40% tap, and a resistor 16b and reactor 16c having a combined lagging phase angle of 60°. The impedance of the resistor 16b and reactor 16c are so related that the voltage appearing across the resistor 16b is equal to 40% of the total voltage impressed upon the resistor 16b and reactor 16c in series and lags the latter voltage by a phase angle of 60°. With this arrangement, the voltage impressed upon the negative sequence voltage relay 15 is proportional to the negative symmetrical components of the voltage applied to the terminals of the filter 16, as explained in the above-mentioned Lenehan patent.

The negative phase sequence voltage relay 15 is designed to close without time delay whenever the negative symmetrical components of polyphase voltage exceed a comparatively small value, such as 25% of the normal positive sequence voltage of the network 5. If any two conductors of the feeder 3 have been transposed in repairing a feeder fault, a negative sequence voltage of considerably higher value than 25% normal positive voltage will be impressed upon the negative phase sequence voltage relay 15, and the latter will close. The relay 15 also operates in the event that any single feeder conductor has been left open in repairing a feeder fault. The case of two conductors of the feeder 3 being open need not be provided for as no short-circuit would occur upon closure of a network protector under these conditions.

Returning to Fig. 1, the operation of the system as a whole may be set forth as follows: to disconnect the feeder 3 entirely at times of light load, the feeder breaker 2 is opened. Upon opening of the feeder breaker 2, the a-phase conductor of the feeder 3 is grounded through back contact members 2a of the feeder breaker. As the feeder 3 is entirely disconnected from ground except through the contacts 2a, no power current flows through the latter, and the maximum current flow is that due to unbalanced feeder charging current. However, the voltage to ground of all the feeder conductors is redistributed, as the neutral ground connection of the source 1 is no longer connected to the feeder 3. The phase-to-ground voltage of all points on the a-phase conductor becomes substantially zero and the phase-to-ground voltages of the two remaining conductors of the feeder 3 increase to approximately 173% of normal as delta voltages are supplied to the feeder 3 from the network 5.

In response to the under-voltage condition produced on the a-phase conductor of the feeder 3, the electrostatic relays 11 of all of the network protectors 6 operate to trip open the corresponding protectors. In this way the feeder 3 is entirely disconnected.

If the feeder breaker 2 is reclosed, the neutral ground connection of the source 1 is again connected to the feeder 3, and the phase-to-ground voltages of each of the conductors of feeder 3 become approximately normal. In response to normal voltage the movable contact member 11a of each electrostatic relay 11 (see Fig. 2) engages the front contact member 11b to complete a circuit for the corresponding timing relay 13. The network protectors 6 accordingly all reclose after a time delay of twenty seconds.

If a fault occurs on the feeder 3, as at point X, the feeder breaker 2 trips open, and establishes a ground on the a-phase conductor of the feeder 3 through its back contact members 2a. In response to this grounded condition, the network protectors 6 trip open in the manner described above. If the fault is a phase-to-ground fault on the a-phase conductor of feeder 3, the voltage-to-ground of the latter conductor may fall below the 30% value to which the network protectors respond, and some of the protectors may open before the feeder breaker 2 opens. In any event, the network protectors 6 are all opened directly or indirectly in response to the fault to completely disconnect the faulted feeder 3.

If in repairing the feeder fault, any two conductors of the feeder 3 are transposed, all three feeder conductors are rotated 120° or 240°, or a conductor of the feeder 3 is left open, one or both of the switches 8 will be tripped to closed position when the feeder breaker 2 is closed. Upon closure of the switch 8, the feeder breaker 2 trips open in response to the artificially established fault, and again establishes a ground through its back contact members 2a. In response to this ground the network protectors 6 are prevented from closing. The feeder conductors at point X may then be transposed until the proper connections are obtained. The closed switch 8 may be manually reset and the feeder 3 restored to operation when the proper connections are established.

If a fault occurs in the high-voltage leads of one of the transformers 4, as at point Y, a somewhat different procedure is followed. In this case the single network protector 6, which controls the power flow through the faulted leads, is blocked open. After the fault has been repaired, and the feeder breaker reclosed, the voltages across this protector are measured with a voltmeter. If no phases have been crossed the open protector is restored to operation. As the repairmen must visit the vicinity of the protector to repair the faulted leads, there is no particular inconvenience in blocking open the single protector involved.

If a fault occurs on the network 5, the fault is burned off in the usual manner. As the impedance of a network transformer, such as 4, is invariably high as compared to the impedance of a feeder, such as feeder 3, the feeder voltage is not greatly reduced in the event of any form of network fault. In the case of the most severe network faults, such as three-phase short circuits close to the transformers, the feeder voltage may fall to a value of the order of 50 to 85% of normal. However, as the electrostatic relays 11 trip only on under-voltage conditions below 30% of normal, none of these relays operate and the protectors 6 all remain closed.

Fig. 4 shows an electromagnetic protector control system which may be used in place of the electrostatic arrangement shown in Fig. 2. Referring to Fig. 4, a potential transformer 17 is connected between one conductor of the feeder 3 and ground. The secondary winding of the potential transformer 17 is connected to energize an instantaneous under-voltage relay 18, an instantaneous over-voltage relay 19 and an induction type over-voltage relay 20. The induction relay 20 is adjusted to close at a minimum voltage of approximately 90% normal and to interpose a time delay of approximately 20 seconds when energized at normal voltage. The under-voltage relay 18 is designed to drop out at a voltage of approximately 30% normal, and the over-voltage relay 19 is designed to close at a voltage of the order of 125% normal. The operation of this arrangement is similar to that described in connection with Fig. 2, except that the over-voltage relay 19 causes the circuit breaker 10 to open in response to grounds on either the b-phase or c-phase conductors of the feeder 3. As the under-voltage relay 18 causes opening of the circuit breaker 10 in response to a-phase grounds, it is immaterial in this arrangement to which phase the control apparatus is connected.

Figs. 5 and 6 show the control apparatus for a modified form of our invention in which the protection against open feeder circuits is provided by the network protectors themselves rather than the grounding switches. In this arrangement also, the network protectors respond directly to all phase-to-phase and phase-to-ground faults independently of the feeder breaker. Referring to Fig. 5, which shows the protector control apparatus, the feeder 3, transformers 4, network circuit breaker 10 and fuses 10a are arranged as in Fig. 2. Three electromagnetic voltage-responsive relays 21 are connected to a pair of V—V connected potential transformers 22 to be energized in accordance with the delta voltage of feeder 3.

The relays 21 are provided for tripping the network circuit breaker 10 in response to phase-to-phase voltage conditions below a predetermined value, such as 30% normal, and for causing reclosure of the network circuit breaker 10 when the feeder 3 is clear of faults and voltage conditions of the feeder 3 are approximately normal. For this purpose the relays 21 may be designed to drop out at a voltage of the order of 30% of normal and to reclose at a voltage approaching normal, such as 95% normal. However, rather than fixing both the drop-out and closing voltages of the relays 21 by design, we prefer to provide a separate closing relay 23 energized in accordance with a phase-to-phase secondary voltage of the transformer bank 4.

The closing relay 23 is designed to close, preferably with time delay, in response to a secondary phase-to-phase voltage of the transformer bank 4 of approximately 95% normal. A ground-detecting relay 24 is provided for causing the network circuit breaker 10 to open in response to a ground on any conductor of the feeder 3. The ground-detecting relay 24 is connected to one conductor of the feeder 3 in series with a suitable impedance 25, shown as a capacitor, and is arranged to trip the network circuit breaker 10 and prevent operation of the closing relay 23 when a ground exists on any phase of the feeder 3. For this purpose the ground-detecting relay 24 is designed to close front contact members in response to an over-voltage condition of the order of 125% normal phase-to-ground, and to close back contact members in response to an under-voltage condition of the order of 30% normal phase-to-ground voltage.

With the arrangement shown in Fig. 5, the network circuit breaker 10 is tripped open in response to a ground on any conductor or a short circuit between any conductors of the feeder 3, and is reclosed with time delay when all phase-to-phase voltages of the feeder 3 are above 60% of normal absolute value, the resultant of two delta voltages of the feeder 3 exceeds 95% of normal, and one phase-to-ground voltage of the feeder 3 lies between 30% and 125% of normal. Under these conditions the feeder 3 is practically certain to be free of all faults and energized by approximately normal voltage.

Referring to Fig. 6, which shows a preferred control arrangement for a grounding switch 8 to be used with the protector 6 of Fig. 5, three voltage-responsive relays 26, similar to the voltage-responsive relay 14 of Fig. 3, are connected across the main contacts of the nearest protector 6. The relays 26 are provided for energizing the trip mechanism 8b of the grounding switch (not shown) in the event of crossed feeder phases, and close in response to voltages of approximately 130% in the same manner as the relay 14 of Fig. 3. This arrangement protects against the transposition of any two feeder conductors or the rotation of all three 120° or 240°. It is not necessary to operate the grounding switch in response to an open feeder circuit with this arrangement as the protectors of Fig. 5 will not close if any feeder circuit is open.

Fig. 7 shows an alternative electrostatic relay arrangement which may be substituted for the electromagnetic relays of Fig. 5. Referring to Fig. 7, three electrostatic relays 27 are each connected in series with pairs of equal capacitors 28 in a delta connection, to be energized in accordance with the phase-to-phase voltages of the feeder 3. The electrostatic relays 27 are designed to close under the same system conditions as the relays 21 of Fig. 5 and to perform the same functions as the latter. A fourth electrostatic relay 29 is provided for causing the network circuit breaker (not shown) to open in the event of ground faults in the same manner as the ground-detecting relay 24 of Fig. 5. A contactor 30 is provided, in this modification, in order to permit reduction of the number of sets of contact members which would otherwise be required on the electrostatic relay 29. Back auxiliary contact members of the network circuit breaker (not shown) are indicated diagrammatically at 31. The operation of the arrangement shown in Fig. 7 is substantially the same as that of the protector shown in Fig. 5 and will be readily understood.

In some applications where it is convenient to block open the protectors and check voltages, the protector shown in Fig. 5, or the modification thereof shown in Fig. 7, may be used without the grounding switch arrangement shown in Fig. 6.

We do not intend that the present invention shall be restricted to the specific structural details, arrangement of parts or circuit connections herein set forth as various modifications thereof may be effected without departing from the spirit and scope of our invention. We desire, therefore, that only such limitations shall be imposed as are indicated in the appended claims.

We claim as our invention:

1. In an alternating-current network system of distribution, a three-phase alternating-current network circuit; supply means therefor including a three-phase alternating-current supply circuit; a network circuit breaker for connecting and disconnecting said circuits, said network circuit breaker having suitable closing means; means responsive to reversed sequence of the phase voltages of said supply circuit for preventing closure of said circuit breaker in the event of an interchange of two phase conductors of said supply means; and means responsive to an excess voltage condition between a phase conductor of said supply circuit and a corresponding phase conductor of said network circuit for preventing closure of said circuit breaker in the event of a transposition of three conductors of said supply means without reversal of sequence.

2. In an alternating-current network system of distribution, a three-phase alternating-current network circuit, supply means therefor including a three-phase alternating-current supply circuit; a network circuit breaker for connecting and disconnecting said circuits, said network circuit breaker having suitable closing means; a negative phase sequence voltage filter connected to said supply circuit for segregating a negative sequence voltage component thereof; means responsive to the negative sequence voltage segregated by said filter for preventing closure of said circuit breaker in the event of an interchange of two phase conductors of said supply means; and means responsive to an excess voltage condition between a phase conductor of said supply circuit and a corresponding phase conductor of said network circuit for preventing closure of said circuit breaker in the event of a transposition of three conductors of said supply means without reversal of sequence.

3. In an alternating-current network system of distribution, a three-phase four-conductor alternating-current network circuit; supply means therefor including a three-phase alternating-current supply circuit; a network circuit breaker for connecting and disconnecting said circuits, said network circuit breaker having suitable closing means; a negative phase sequence voltage filter connected to said supply circuit for segregating a negative sequence voltage component thereof; means responsive to the negative sequence voltage segregated by said filter for preventing closure of said circuit breaker in the event of an interchange of two phase conductors of said supply means; and means responsive to an excess voltage condition between a phase conductor of said supply circuit and a corresponding phase conductor of said network circuit for preventing closure of said circuit breaker in the event of a transposition of three conductors of said supply means without reversal of sequence, said excess voltage condition being of the order of 140% of the normal line-to-neutral voltage of said network circuit.

4. In an alternating-current network system of distribution, a three-phase alternating-current network circuit; a three-phase alternating-current feeder circuit; a plurality of transformer means for supplying power from said feeder circuit to said network circuit; a plurality of network circuit breakers for controlling the power flow through said transformer means, each of said circuit breakers having individual closing means therefor; means individual to said circuit breakers for preventing closure of the corresponding circuit breaker when a predetermined abnormal condition of said feeder circuit exists; and a group phasing device for all of said circuit breakers comprising an element effective, when operated, to establish said predetermined abnormal condition of said feeder circuit, means responsive to reversed sequence of the phase voltages of said feeder circuit for operating said element, and means responsive to an excess voltage condition between a secondary conductor of one of said transformer means and a corresponding phase conductor of said network circuit for operating said element.

5. In an alternating-current network system of distribution, a three-phase alternating-current network circuit; a three-phase alternating-current feeder circuit; a plurality of transformer means for supplying power from said feeder circuit to said network circuit; a plurality of network circuit breakers for controlling the power flow through said transformer means, each of said circuit breakers having individual closing means therefor; means individual to said circuit breakers for preventing closure of the corresponding circuit breaker when a predetermined abnormal condition of said feeder circuit exists; and a group phasing device for all of said circuit breakers comprising an element effective, when operated, to establish said predetermined abnormal condition of said feeder circuit, a negative phase sequence voltage filter for segregating a negative sequence component of voltage of said feeder circuit, means responsive to the negative sequence voltage segregated by said filter for operating said element, and means responsive to an excess voltage condition between a secondary phase conductor of one of said transformer means and a corresponding phase conductor of said network circuit for operating said element.

6. In an alternating-current network system of distribution, a three-phase four-conductor alternating-current network circuit; a three-phase alternating-current feeder circuit; a plurality of transformer means for supplying power from said feeder circuit to said network circuit; a plurality of network circuit breakers for controlling the power flow through said transformer means, each of said circuit breakers having individual closing means therefor; means individual to said circuit breakers for preventing closure of the corresponding circuit breaker when a predetermined abnormal condition of said feeder circuit exists; and a group phasing device for all of said circuit breakers comprising an element effective, when operated, to establish said predetermined abnormal condition of said feeder circuit, a negative phase sequence voltage filter for segregating a negative sequence component of voltage of said feeder circuit, means responsive to the negative sequence voltage segregated by said filter for operating said element, and means responsive to an excess voltage condition between a secondary phase conductor of one of said transformer means and a corresponding phase conductor of said network circuit for operating said element, said excess voltage condition being of the order of 140% of the normal line-to-neutral voltage of said network circuit.

JOHN S. PARSONS.
GEORGE O. HARRISON.